(12) United States Patent
Choi

(10) Patent No.: US 6,642,848 B1
(45) Date of Patent: Nov. 4, 2003

(54) SHOCK SENSOR BY VARIABLE CAPACITOR

(76) Inventor: Sang J. Choi, 2425 W. 183rd St. Apt. A, Homewood, IL (US) 60430

( * ) Notice: Subject to any disclaimer, the term of this patent is extended or adjusted under 35 U.S.C. 154(b) by 2 days.

(21) Appl. No.: 10/122,167

(22) Filed: Apr. 15, 2002

(51) Int. Cl.[7] ................................................ G08B 13/00
(52) U.S. Cl. ...................... 340/566; 340/426; 340/429; 340/683; 73/649; 73/651; 73/652; 73/514.25; 73/653
(58) Field of Search ................................ 348/566, 426, 348/429, 683; 73/649, 651, 652, 514.25, 653

(56) References Cited

U.S. PATENT DOCUMENTS

| | | | | |
|---|---|---|---|---|
| 2,916,279 A | * | 12/1959 | Stanton | 73/514.32 |
| 5,095,752 A | * | 3/1992 | Suzuki et al. | 73/514.32 |
| 5,719,336 A | * | 2/1998 | Ando et al. | 73/514.32 |
| 6,196,067 B1 | * | 3/2001 | Martin et al. | 73/514.32 |
| 6,422,077 B1 | * | 7/2002 | Krauss et al. | 73/514.25 |

* cited by examiner

*Primary Examiner*—Daniel J. Wu
*Assistant Examiner*—Tai T. Nguyen

(57) ABSTRACT

This invention is pertaining to multi purpose shock sensor comprising three conductive plates arranged in 3 layers in parallel which make 2 variable capacitors connected in series. Two outer plates are firmly attached to a supporting insulating material and the center plate is located between the 2 outer plates and arranged as movable by resilient element toward either side of the outer plate depending on the direction of the impact felt on the shock sensor causing changes of the capacitance values of the both capacitors. If the 2 capacitors are connected across a voltage source through a resistor, the voltage is charged across the 2 capacitors and their charged values are inversely proportional to their capacitance values. Moving the center plate due to a shock causes changes on both capacitance values, which change voltages across the capacitors, and the changed voltage can be used to activate an object. The shock sensor can be used for door alarm, auto alarm, hard disk drive sensor, automobile impact sensor and other applications.

5 Claims, 2 Drawing Sheets

SHOCK SENSOR BY VARIABLE CAPACITOR

REFERENCES CITED

U.S. Patent Documents

| | | |
|---|---|---|
| 4,282,511 | 08/1981 | Bonner |
| 5,326,945 | 06/1995 | Gotoh et al |
| 5,483,225 | 01/1996 | Hwang |
| 5,551,280 | 09/1996 | Lee |
| 5,557,495 | 09/1996 | Belcher et al |
| 5,664,665 | 09/1999 | Kobayashi et al |
| 5,901,031 | 05/1999 | Ishige et al |
| 6,011,415 | 01/2000 | Hwang et al |
| 6,031,317 | 02/2000 | Chen |
| 6,142,007 | 11/2000 | Yuze et al |
| 6,242,989 | 01/2001 | Barbel et al |

FEDERALLY SPONSORED RESEARCH OR DEVELOPMENT

Not applicable,

MICROFICHE APPENDIX

FIELD OF INVENTION

The present invention relates to a shock sensor made of variable capacitors connected in series, used in door alarm, auto alarm, hard disk drive shock sensing devices, and automobile impact detector.

BACKGROUND OF THE INVENTION

Conventional shock sensors utilize a Piezo sensor or a Reed Switch to detect a shock experienced by an object. In a Piezo sensing system, in general, the sensitivity is poor because their sensed output is very low. It is necessary to have additional amplifying and control circuits. The structure of the product is complicated and their reliability is very poor.

In a Reed switch system, a magnetic device is used to activate and deactivate the switch depending upon the physical location of the magnet controlled by the extent of the shock given by the object. It is also difficult to adjust the sensitivity properly. Closing and opening the contact of a switch for a long period would cause the contact corrosive.

In a prior art, a shock sensor is made of a magnet, an inductor, a magnetically soft material, and a support bracket, and external circuit to amplify the electromagnetically induced voltage by the coil. To obtain the proper level of output voltage, for a product of the invention, the design process would not be easy. With those various parts, it may be too costly for a shock sensor of an automobile alarm system.

In another prior art, a pendulum and ring-assembly are used as a vibration responsive switch, which provides the circuit closure to activate an alarm. For this system, initially relatively heavy current is flowing through the contact of ring and pendulum switch because a gate current of a SCR system is flowing through the switch. This makes the ring and pendulum contact surface corrosive and will eventually reach to the point where the result is unsatisfactory. During initial assembly process, the positioning of the ring and pendulum may be difficult for a better sensitivity of the shock sensor.

SUMMARY OF THE INVENTION

In consideration of the aforementioned drawbacks and deficiencies of a shock sensor, the present invention endeavors to provide a reliable, simple, durable, and economical shock sensor with the wide range of application. As a first choice, this invention uses three conductive plates to comprise two capacitors connected in series. Two outer plates are firmly attached to a plastic support means which is an insulating material, and the center plate is arranged as movable within the two outer plates and connected to said plastic support means through a resilient part. The center plate is located at the middle of the distance between the two outer plates. The capacitance values of the two capacitors are the same provided that the outer plates are identical in shape, area, thickness, and material. When the two capacitors are connected to a DC voltage source in series with a resistor, each capacitor is charged to a one half of the applied voltage under the stand still. If the center plate is tilted toward an outer plate due to a shock, the capacitance values of the both capacitor would change in such a way that the smaller the distance between the plates is, the larger the capacitance, and vice versa. With the fixed supply voltage, the voltage charge across each capacitor is inversely proportional to the capacitance value. For an example, if the center plate is tilted toward the lower plate, the lower capacitance value is increased and the upper capacitance values is decreased, and the voltage charge across the lower capacitor is decreased and the voltage charge across the upper capacitor is increased. The changed value across one of the capacitor can be used at the next electronic circuit to process it and activate a desired object. As a second choice, this invention may use 2 conductive plates to comprise one capacitor where only 2 wires are available to be connected. If an external capacitor purchased from a store with an appropriate value is connected in series with the single capacitor of this invention, the same result would be obtained. However, 2 capacitors cascaded arrangement is preferable because the voltage change across a capacitor would be greater for a given extent of shock than a single capacitor connected with another fixed external capacitor in series. The tip of the movable plate (center plate) may be longer or wider or thicker than the outer plates to provide more weight for facilitating movement of the plate. Two coil springs can be used, one at each side of the center plate for more precision sensitivity. Not like a Piezo sensor which generates very minute sensor output, the present invention produces an apparent sensor output. Unlike a Reed switch method which checks only whether the switch is closed or open, the present invention can respond to any value of change. It is very simple to make and use a product of this invention and is very economical to produce a product of the present invention.

DETAILED DESCRIPTION OF PREFERRED EMBODIMENTS

Figure 1:
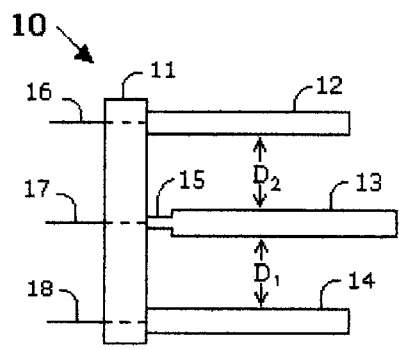
FIG. 1 is an exploded cross sectional view of an embodiment of a shock sensor of this invention.

The present invention will now be described in detail with reference to the embodiments illustrated in the drawings.

Figure 1A:
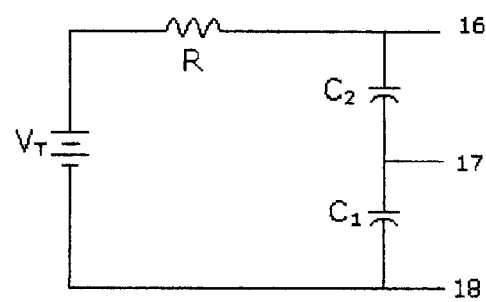
FIG. 1A is a schematic diagram of FIG. 1 with additional voltage source and resistor.

With reference to FIG. 1, embodiment 10 of a shock sensor of the present invention includes 3 conductive plates (12, 13, 14) coated by insulating material and affixed to a plastic support (11). Two outer plates (12, 14) are firmly affixed to the plastic support as not to move by any shock influenced on them. The center plate (13) is affixed to the insulating support (11) through the resilient part (15), which is narrower or thinner than the main plate portion (13) and flexible to move the plate (13) toward one side of outer plate depending on the shock applied to the shock device. The distances between the center plate (13) and two outer plates may be any ratio, however, it is preferred to be 1:1 ratio, that is $D_1=D_2$. Two variable capacitors are comprised of three plates, first capacitor formed by the lower plate and the center plate, second capacitor formed by the center plate and the upper plate. If two outer plates are identical in shape, area, and material and located at the same distance from the center plate, $D_1=D_2$, then the capacitance values of the first capacitor and second capacitor are equal. However, if the center plate is tilted toward an outer plate, for example toward lower plate, the distance $D_1$ become smaller and the distance $D_2$ become lager, resulting with the lower side capacitance increased and the upper side capacitance decreased. The capacitance value is inversely proportional to the distance of the two plates making the capacitor. In FIG. 1A, the voltage charge across each capacitor ($C_1$, $C_2$) is inversely proportional to the capacitance value, and total voltage ($V_T$) equals $V_{C1}$ plus $V_{C2}$. The resistor limits the charging current of the capacitors. The capacitance value is also affected by the area of the plates. It is directly proportional to the size of the area. Terminals (16), (17), (18), are for the electrical connections for the respective plates to an electronic circuit to process the changed voltage across a capacitor due to the shock sensed by a device. Since the center plate (13) is tilting toward an outer plate, depending upon the strength of the shock sensed by a device, it might touch the outer plate causing a spark between the contact. An insulating material can be coated on the surfaces of the plates to prevent the spark caused by the discharging current of the capacitor from occurring when the center plate is tilted enough to touch an outer plate. The contact area may only be coated by the insulating material for the same purpose. The insulation coating on the whole area may help to increase the capacitance value.

Figure 2:
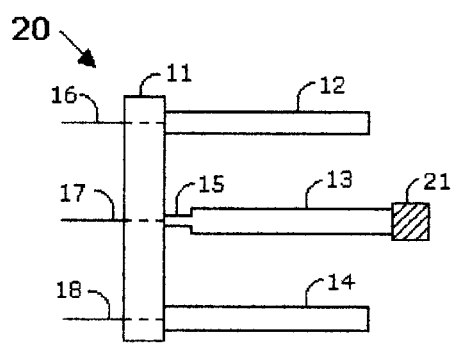
FIG. 2 is the same as that of FIG. 1 excepts the tip portion of the center plate, which is wider, or longer, or thicker.

As of FIG. 2, the drawing is almost same as that of FIG. 1 except the tip (21) of the center plate (13). The materials of the tip (21) and the center plate (13) are the same, but the tip may be wider, or thicker than the plate (13) to provide more weight for facilitating the tilting or movement of the plate (13).

Figure 3:
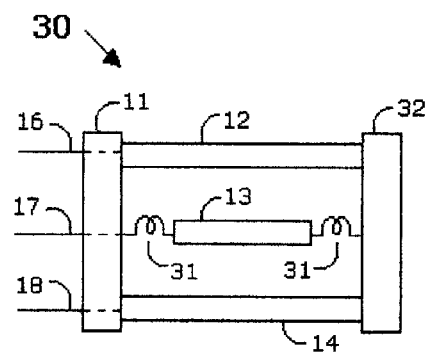
FIG. 3 is the same as that of FIG. 1 except the resilient parts of the center plate, which are coil springs for this embodiment.
Figure 4:
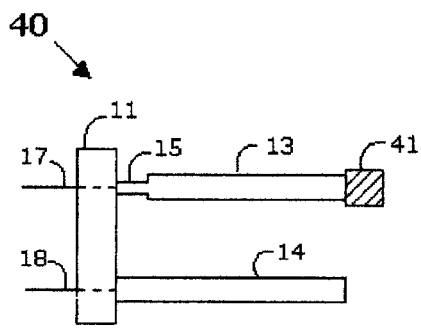
FIG. 4 is the same as that of FIG. 2 except that only 2 plates are shown for one capacitor instead of 2 capacitors.

With reference to FIG. 3, the drawing shows the same structure as that of FIG. 1 except the resilient parts (31) and another plastic support (32) added. In this embodiment, 2 springs (31) are used to affix the center plate (13) to the plastic supports (11, 12) instead of thin resilient part shown in FIG. 1. With the arrangement of the 2 springs, the center plate may move more evenly toward one of the outer plates rather than tilting. This will provide more accurate changes to the capacitance value with high degree of controllable sensitivity. An additional plastic support (32) is necessary to affix the center plate (13) to both sides by 2 springs (31). With reference to FIG. 4, the drawing shows the same structure as that of FIG. 2 except that only 2 plates are used to provide 1 variable capacitor instead of 2 capacitors shown in FIG. 2. With this embodiment of the present invention, an external fixed capacitor can be connected in series to use in the same kind of application, but the efficiency is not as good as the one shown in FIG. 2.

Figure 5:
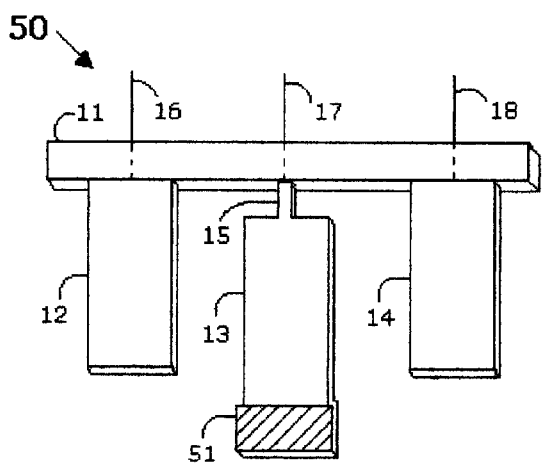
FIG. 5 is a plan view of a major part of an embodiment of a shock sensor of the present invention.

As of FIG. 5, this drawing is displaying exactly the same structure of the embodiment of FIG. 2 except that this shows the plan view of the 2 variable capacitors with the 3 plates.

Figure 6:
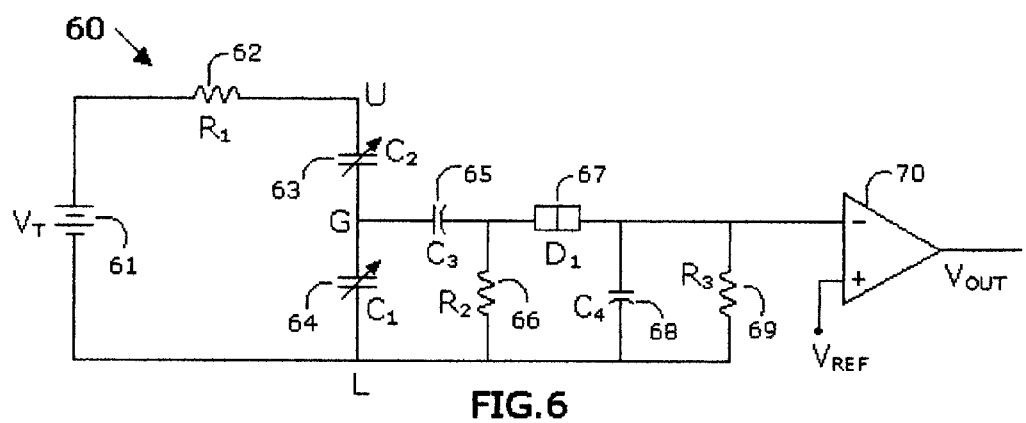
FIG. 6 is an equivalent circuit diagram showing an example of a circuit configuration of a shock sensor employing the variable capacitors of the present invention.

FIG. 6 shows that the two variable capacitors ($C_1$, $C_2$) of the present invention are connected to an associated electronic control circuit as an example. Point U is connected to the upper plate, point G is connected to the center plate and point L is connected to the lower plate. Supply voltage $V_T$ is connected across $R_1$, $C_1$ and $C_2$ in series. If the values of $C_1$ and $C_2$ are equal, the charged voltages across each capacitors are the same, each having one half of $V_T$ under the stand still state. The comparator (70) is so adjusted with the $V_{REF}$ that $V_{OUT}$ stays at one level under the stand still state. When a device of this circuit arrangement senses a shock, the center plate will vibrate changing the capacitance values, increasing one and decreasing the other. During next half cycle, the states are just opposite. This vibration action changes voltages across $C_1$ and $C_2$ generating a pulsating AC signal. The AC signal is coupled by $C_3$ to the rectifier circuit consisting of $D_1$, $C_4$, and $R_3$. The rectified DC voltage applied to the minus terminal of the comparator (70) overcomes the $V_{REF}$ voltage and changes $V_{OUT}$ to the opposite state of level. This changed output state can activate the device for the desired operation. $R_1$ (62) is current limiting resistor, and limits the charging current of the capacitors (63, 64).

What is claimed is:

1. A shock sensor comprising:
   three metal conductive plates, of which two metal conductive outer plates affixed firmly to insulator support means, separated with some distances by a movable metal conductive center plate affixed to said support means through an elastic means, wherein the three plates comprising two variable capacitors connected in series;
   a voltage source to supply charging voltage across each capacitor, wherein the voltage across each capacitor detects the changed capacitance in response to shock, or impact felt on the center plate;
   a resistor connected in series with said two variable capacitors across the voltage source to limit the charging current;
   insulating support means to which the conductive plates affixed, wherein if the center plate vibrates caused by a shock sensed on the plate, the capacitance values of said two variable capacitors are changed, in response to shock or impact applied on the plate, in turn, changing the voltage drop across each capacitor, the changed voltage is inversely proportional to the capacitance value.

2. The shock sensor according to claim 1, wherein said metal center plate includes an elastic conductive part for vibrating said metal center plate when a shock is sensed, on the plate, and optionally a weight member to facilitate the movement of the plate.

3. The shock sensor according to claim 1, wherein said metal center plate includes two elastic springs to attach the plate to the plastic support(s).

4. The shock sensor according to claim 1, wherein said three metal conductive plates comprising two variable capacitors, of which two outer plates are firmly affixed to the plastic support means and are not movable, the center plate is affixed to the plastic support means through said elastic part and is movable to change the capacitance values of said capacitors when a shock is applied to the plate.

5. The shock sensor according to claim 1, wherein said three metal conductive plates are coated with an insulating material to prevent a spark when the metal center plate touches an outer plate, and provided an electrical terminal for each plate for external connection.

* * * * *